Patented Nov. 4, 1952

2,616,876

UNITED STATES PATENT OFFICE 2,616,876

CURING RUBBERY SUBSTANCES WITH META-DINITROSO AROMATIC COMPOUNDS

John Rehner, Jr., Westfield, N. J., and Paul J. Flory, Ithaca, N. Y., assignors to Standard Oil Development Company, a corporation of Delaware No Drawing. Application May 6, 1949, Serial No. 91,866

11 Claims. (Cl. 260—85.3)

1

This invention relates to curable rubber-like substances, relates particularly to means and methods for curing elastomers or rubber-like substances generally, including such elastomers as the interpolymers of isobutylene and a polyolefin, and relates especially to the curing of low temperature copolymers by reaction with meta-dinitroso aromatic compounds.

This application is a continuation-in-part of application Serial No. 507,188 filed October 21, 1943, now abandoned.

It has been found possible to produce an interpolymer of an isoolefin such as isobutylene with a polyolefin such as butadiene at temperatures ranging from —40° C. to —165° C., preferably within the temperature range between —77° C., and —103° C., by the application thereto of Friedel-Crafts catalysts, preferably in solution in a low freezing, non-complex forming solvent to yield solid polymers of high molecular weight which are reactive with sulfur in a curing reaction which is in some ways analogous to the vulcanization of rubber.

It is now found that this low temperature copolymer, and the elastomers or rubbery substances generally, both natural and synthetic, which are conveniently defined as those solid organic substances which are characterized by a substantial chemical unsaturation sufficient to combine with sulfur in a curing reaction and when cured, have an elongation under tension, short of the breaking point, ranging from 200 to 1200%, a forcible retraction upon release of tension to approximately original size and shape and a tensile strength at break ranging between 500 pounds per square inch and 5000 pounds per square inch, are reactive in a curing process with the meta-dinitroso aromatic compounds generally.

The rubbery substances or elastomers as so defined, which cure readily with the meta-dinitroso aromatic compounds include the low temperature interpolymers of isobutylene with a polyolefin having from 4 to 14 carbon atoms per molecule; and include natural rubber, polybutadiene, the interpolymer of butadiene with acrylonitrile, the interpolymer of butadiene with styrene, polychloroprene and the like. These elastomers, when cured with the meta-dinitroso compounds, show adequate tensile strengths and good values for other physical properties, and at the same time show an outstandingly high speed of curing.

Thus the present invention cures a chemically unsaturated elastic polymer by the combination therewith of a meta-dinitroso aromatic compound at temperatures ranging from room temperature up to approximately 400° F., to develop therein an elastic limit, and destroy the original plasticity. The "meta-dinitroso aromatic compounds" are those in which there is, as basic structure, a benzene ring having two —N=O groups in the meta position relationship and it does not appear that the curing power is destroyed by any substituents which do not destroy this configuration. Unfortunately, however, a considerable number of compounds are called meta-dinitroso compounds which are not so in fact, since the high reactivity of the —N=O group results in the unexpected destruction of this essential configuration to produce instead a wide range of other aromatic compounds which are not in fact dinitroso compounds, even though the starting material from which they were made should have yielded a meta-dinitroso compound with substituents. It is found, however, that in general, hydrocarbon substituents modify the capability of curing only slightly, usually in a favorable direction, and that the esters, formed through the nitroso oxygen also do not interfere with the curing reaction. With other substituents there appears to be no way to predict whether the resulting compounds will or will not remain as meta-dinitroso compounds, and accordingly, the mere fact that a proximate analysis shows the proper proportion of nitrogen oxygen, etc., for a substituted dinitroso compound, does not by any means, insure the existence of such a structure. Other objects and details of the invention will be apparent from the following description.

A suitable primary raw material for the practice of the present invention is the low temperature interpolymer of an isoolefin with a polyolefin. For this polymer, isobutylene is the preferred major component, but other isoolefins such as 2-methyl butene-1; 2-methyl penetene-1, or 2-methyl hexene-1, or the like may be used. The isoolefin is mixed with a minor proportion of a polyolefin such as butadiene or isoprene or piperylene or dimethyl butadiene or dimethallyl or myrcene or such compounds as 2-methyl, 3-nonyl butadiene 1-3, or 2-ethyl, 4-octyl pentadiene 1-4; substantially any of the polyolefins having from 4 to 14 carbon atoms per molecule being usable. The olefinic mixture is cooled to a temperature within the range from −20° C. to −103° C., or even as low as −165° C., by the use in a refrigerating jacket around the reactor or by admixture with the polymerizable olefins of such refrigerants as liquid propane, solid carbon dioxide, liquid ethane, liquid ethylene or even liquid methane.

The polymerization is caused to occur by the use of a Friedel-Crafts type catalyst such as aluminum chloride in solution in a low freezing, non-complex-forming solvent. While aluminum chloride is the preferred catalyst, substantially any of the Friedel-Crafts catalysts disclosed by N. O. Calloway in his article on "The Friedel-Crafts Synthesis" printed in the issue of "Chemical Reviews" published for the American Chemical Society at Baltimore in 1935, in volume XVII, No. 3, the article beginning on page 327, the list being particularly well shown on page 375, may be used. Most of these catalysts are preferably used in solution in a low-freezing, non-complex forming solvent. To be low freezing, it is only necessary that the solvent have a freezing point below that of water. (It is not necessary that the freezing point of the solvent be below the polymerization temperature, since the solution of catalyst dissolves readily in the cold polymerization mixture before it has a chance to congeal and separate out in the solid form.) To be non-complex forming, it is merely necessary that the solvent shall not form a stable compound with the solvent, from which a substantially higher temperature than the boiling point of the solvent is required to drive off the solvent, and in general, that instillation to or distillation from the solute shall not result in a temperature change of more than a very small number of degrees.

The catalyst solution is conveniently applied to the cold mixed olefinic material in the form of a spray delivered onto the surface of the rapidly stirred olefinic mixture. Alternatively, the catalyst solution may be delivered as a jet into a zone of high turbulence in the olefinic material in any convenient way or it may be delivered in any convenient manner which obtains a rapid dispersion of the catalyst solution into the cold olefinic mixture. The polymerization proceeds rapidly to yield a solid polymer having a relatively very high molecular weight.

This molecular weight is conveniently determined by a measurement of the intrinsic viscosity of the polymer in solution, preferably in diisobutylene at 20° C. as outlined by E. O. Kramer in "Industrial and Engineering Chemistry," volume 30, page 1200, (1938). The preferred form of polymer has an intrinsic viscosity preferably within the range between 0.6 and about 5. This viscosity, as shown by the work of Paul J. Flory reported in the Journal of the American Chemical Society, volume 65, page 372 (1943) corresponds to an actual molecular weight between 120,000 and 3,000,000 (this being equivalent to the Staudinger molecular weight number, or "molecular weight" by the Staudinger Method of approximately 20,000 to 150,000). The preferred range of intrinsic viscosities lies between about 1 and 2.5, corresponding to actual molecular weights of 400,000 to 1,000,000; and corresponding to Staudinger numbers between 31,000 and 78,000.

The relationship between the intrinsic viscosity of a polymer in solution in diisobutylene at 20° C., the Staudinger number and the viscosity average molecular weight is well shown in the following table:

| Intrinsic Viscosity in Diisobutylene at 20° C. ($\eta$) | Staudinger Number $\times 10^3$ | Viscosity Average Molecular Weight $\times 10^3$ |
|---|---|---|
| 0.20 | 6.2 | 21.2 |
| .40 | 12.5 | 63 |
| .60 | 18.7 | 120 |
| .80 | 24.9 | 185 |
| 1.00 | 31.2 | 264 |
| 1.25 | 39.0 | 373 |
| 1.50 | 46.8 | 495 |
| 1.75 | 54.7 | 630 |
| 2.00 | 62.5 | 775 |
| 2.5 | 78.1 | 1,100 |
| 3.0 | 93.7 | 1,460 |
| 3.5 | 109 | 1,860 |
| 4.0 | 125 | 2,300 |
| 5.0 | 156 | 3,250 |

The "intrinsic viscosity" is given by the equation $(1n\eta_r)/c$ where $\eta_n$ is the relative viscosity (ratio of viscosity of solution to that of the solvent) of a dilute solution of the polymer in diisobutylene at 20° C., and $c$ is the concentration of polymer in gms. per 100 cc. The concentration should be such that $\eta_r$ does not exceed about 1.4. (See E. O. Kraemer, Ind. Eng. Chem. 30, 1200 (1938) for the definition of the term "intrinsic viscosity" designated by $(\eta)$.)

Staudinger numbers, formerly referred to as "molecular weights," are obtained by multiplying $(\eta)$ by about $3.12 \times 10^4$).

A preferred form of the invention utilizes for the reaction a polymer having an iodine number (by the Wijs method) of from 0.5 to about 10 (which is the material sold over the past several years through the Rubber Reserve Corporation, under the trade-name of "Butyl"), as the low temperature copolymer of isobutylene with isoprene, or other multiolefin as shown by Thomas and Sparks Patent Numbers 2,356,127-8, according to which disclosure polymers up to an iodine number of approximately 50 are readily prepared). The invention is equally applicable to the higher unsaturation polymers having iodine numbers from 50 or 60, up to about 150 or 175, as shown in Serial No. 788,640, filed by Nelson and Welch on November 28, 1947, both of which are herewith made parts of this application.

The polymer is brought up to room temperature from the polymerization mixture in any convenient manner, although the preferred procedure is to dump the reaction mixture into warm water or warm alkaline solution or warm alcohol or the like to destroy the catalyst activity and start the purification of the polymer. The polymer is then desirably washed on the open roll mill with clear water to obtain a further purification and it may, if desired, be purified in many other ways.

The preferred method of preparing the polymer is by a continuous process in which streams of the olefins and a diluent are delivered to a refrigerant jacketed reactor with a separate stream of catalyst delivered to the same reactor, and an overflow of slurry of polymer is diluent and unreacted monomers discharged from the top of the reactor. This discharged slurry is preferably conducted into a tank of warm water from which the diluent, unreacted monomers and catalyst solvent are volatilized for separation, purification and re-use, and a flowable slurry of polymer in water is withdrawn and conducted to a strainer or other convenient separator to remove as much water as possible. The resulting cake of polymer crumb is then dried, preferably in a tunnel drier, passed through an extruder, and then milled briefly on the double roll mill to bring it into convenient sheet form for packaging and subsequent processing.

As pointed out above, other suitable raw materials for the practice of the present invention are found in the polymer of butadiene prepared either in emulsion with a peroxide catalyst, or in mass form with metallic sodium; or in the several interpolymers of butadiene such as the interpolymer of butadiene with styrene or of isoprene with styrene or of piperylene with styrene or of butadiene with acrylonitrile prepared in emulsion under pressure at temperatures ranging from 20 to 70° C. Likewise the emulsion interpolymer of chloroprene is suitable for curing according to the present invention. Likewise, natural rubber in all of its forms and equivalents is suitable for the raw material of the present invention. These materials show iodine numbers (by the Wijs method) of from about 200 or a little below to 175, up to about 340, the lower numbers being characteristic of the copolymers of butadiene with styrene and acrylonitrile, the higher numbers being those characteristic of natural rubber.

In utilizing the polymer, it is desirably compounded with a wide range of substances including zinc oxide, stearic acid, carbon black and various other pigments, fillers and protective and improving agents.

For the purpose of the present invention, the polymer is compounded with from 0.1% to 6% of a curing agent in the form of a meta-dinitroso aromatic compound.

The meta-dinitroso compound is the second element of the invention. Meta-dinitroso benzene itself is the preferred curing agent, but any compound having the structural formula

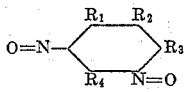

in which $R_1$, $R_2$, $R_3$, and $R_4$, may be hydrogen or any desired hydrocarbon substituent, including a methyl substituent, an ethyl substituent, propyl, butyl, pentyl, hexyl, nonyl, and the like, up to at least 12 carbon atoms. $R_1$ and $R_2$, as well as $R_3$ and $R_4$ may also be the points of attachment for another aromatic substituent to produce a meta-dinitroso naphthalene derivative. Also, the substituent at $R_1$, $R_2$, $R_3$, or $R_4$ may be a phenyl group. In addition, any of the esters formed with an oxygen from the nitroso group may also be used. Extensive tests of these compounds show that the compounds as so described, are all operative and all have special properties which are of particular value under special circumstances. Many of the compounds having still other substituents are useful and have been shown to be useful. Others which are said to be dinitroso compounds are not in fact such, but have been modified by side reactions into other structures which are without curing effect. It may be noted that meta-dinitroso compounds of this type are very highly reactive and a great many secondary and side reactions are possible, some of which occur merely on standing, and others occur upon heating and from a wide range of other causes. However, the hydrocarbon-substituted compounds and the esters, with or without substituents, uniformly function properly, and are sufficiently stable to retain their activity during storage over a considerable length of time, and in addition, various diluents such as clay, talc, and many other inert, inorganic pigments may be mixed in to increase further the stability.

EXAMPLE 1

A polymer was prepared as above described consisting of 855 parts of isobutylene with 145 parts of isoprene (by weight) to yield a polymer having an intrinsic viscosity of approximately 1.3, corresponding to a viscosity average molecular weight of about 400,000 (a Staudinger number or "molecular weight" of about 42,000), and an iodine number of about 2.5. This material was then mixed on a cold mill according to the following recipe:

|  | Parts |
| --- | --- |
| Polymer | 100 |
| Stearic acid | 5 |
| Zinc oxide | 5 |
| Carbon black (channel black) | 60 |

This mixture was separated into three portions and the three portions successively compounded on the mill with 0.2 part of meta-dinitroso benzene per 100 parts of polymer, 0.5 part of meta-dinitroso benzene per 100 parts of polymer, and 1 part of meta-dinitroso benzene per 100 parts of polymer (by weight). Each portion was then divided in half and the respective portions cured and tested, as shown in Table I.

| Designation | Parts m-dinitroso benzene per 100 parts Butyl | Cure, Time in min., at 240° F. | T. S., lbs./in. | Percent Elong. |
| --- | --- | --- | --- | --- |
| A | 0.2 | 15 | 185 | 900 |
|  |  | 30 | 200 | 950 |
| B | 0.5 | 15 | 730 | 525 |
|  |  | 30 | 800 | 625 |
| C | 1.0 | 15 | 800 | 400 |
|  |  | 30 | 570 | 425 |

These results demonstrate the rapidity of cure.

EXAMPLE 2

A low temperature polymer was prepared as above described utilizing approximately 97 parts of isobutylene with three parts of isoprene at a temperature of about −98° C., in the presence of approximately 3 volumes of methyl chloride as diluent with approximately 0.05 volume of a 0.6% solution of aluminum chloride in methyl chloride per volume of mixed isobutylene and isoprene to produce a copolymer having a Staudinger molecular weight number of approximately 45,000 and an iodine number of approximately 2.5. This material was washed, dried and milled until it "banded" nicely and was then compounded according to the following recipe:

|  | Parts |
| --- | --- |
| Polymer | 100 |
| Stearic acid | 5 |
| Zinc oxide | 5 |
| Carbon black (channel black) | 60 |
| m-Dinitroso benzene | 2 |

The material was then cured for fifteen minutes at 240° F. and found to show a tensile strength at break of approximately 1700 lbs., per square inch; an elongation at break of approximately 500% and a modulus at 300% elongation of approximately 500.

EXAMPLE 3

A similar compound to that in Example 2 was prepared, utilizing a dinitroso cymene (para-isopropyl meta-dinitroso benzene). This material was cured as before and found to show a somewhat slower curing rate and a similar tensile strength elongation and modulus.

The dinitroso compounds form a homologous series beginning with the simple meta-dinitroso benzene and continuing through a substantial series characterized by the substitution of aliphatic radicals for the hydrogen present in the benzene ring of the simple meta-dinitroso compound. Some of these compounds are reasonably easy to prepare, and some are more difficult to prepare; some, as far as a literature search will show, have never been prepared. However, tests of those which are available indicate that there is no significant change in curing power from the addition of aliphatic substituents, without regard to the size, that is, number of carbon atoms per substituent, nor number of substituents; that is whether one, two, three or four hydrogens are replaced in the benzene ring by substituents. The reactions with compounds containing successively larger substituents indicate however a reduction in reaction energy with increasing substituent size; thereby reducing the tendency towards scorchiness on the mill. In some instances the scorchinness is sharply reduced without significant change in speed of curing reaction. In other instances, both scorchiness and curing speed at curing temperature are reduced. These facts make it possible for the compounder to "tailor" his recipe according to the needs of the particular rubber structure being prepared.

The number of meta-dinitroso compounds known, which contain either aromatic or olefinic substituents is very small and the methods of preparation are relatively unsatisfactory. Nevertheless, tests of such compounds as are available indicate that the presence of aromatic and olefinic substituents likewise have similar effects on scorchiness and curing rate. The presence of other substituents containing the halogens, likewise appears to be without significant effect upon the curing reaction. The presence in substituents of oxygen and nitrogen usually results in a reorganization of the molecular structure to such an extent as to destroy the actual meta-dinitroso configuration, and there is available at the present time insufficient knowledge to predict whether a given chemical procedure will yield a metadinitroso compound containing oxygen or nitrogen or the like, or whether the structure will be so unstable as not to be maintained. When the meta-dinitroso structure is maintained, the compounds are in general, more or less effective curing agents, but the dinitroso structure usually is not maintained and only a trial will show whether a compound containing oxygen or other analogous substituents does, in fact, retain its dinitroso structure, so as to be a curing agent.

It may be noted that the oxygen atoms in the structural formula previously given readily esterify with organic acids, such as formic, acetic, oxalic, propionic, and the like, up to at least 18 carbon atoms, and it is not necessary that the acid be saturated, since it may equally well be an unsaturated acid. The aromatic acids are equally useful as esterifying agents. It is found that the esters, while somewhat expensive to prepare, show a marked reduction in scorchiness on the mill without any significant reduction in activity at normal curing temperatures.

EXAMPLE 4

A copolymer of butadiene and acrylonitrile was prepared by mixing the two materials in the proportion of 74 parts of butadiene with 26 parts of acrylonitrile in emulsion in approximately 400 parts of water with approximately 1 part of sodium soap, and approximately 1 part of benzoyl peroxide. The polymerization was conducted in the usual manner to yield a polymer latex, which was coagulated with brine and acid and the polymer recovered and purified in the usual way. The polymer was then compounded on a cold mill according to the following recipe:

| | Parts |
|---|---|
| Butadiene acrylonitrile polymer | 100 |
| Stearic acid | 5 |
| Carbon black (channel black) | 50 |
| Zinc oxide | 5 |
| Meta-dinitroso benzene | 1 |

The resulting compound was divided into samples which were cured as test specimens for 15 and 30 minutes at 240° F. The inspection records are shown in the following Table I:

*Table I*

| Time of Cure, Min. | Tensile Strength, lbs./sq. in. | Percent Elongation |
|---|---|---|
| 15 | 3,040 | 475 |
|  | 2,820 | 450 |
| 30 | 3,840 | 400 |
|  | 3,770 | 400 |

These results show the excellent quality of the resulting cured polymer and the high speed of curing.

EXAMPLE 5

An interpolymer of butadiene and styrene was prepared in substantially the same manner as the polymer in Example 6. This polymer was then compounded on the cold mill according to the following recipe:

| | Parts |
|---|---|
| Butadiene styrene polymer | 100 |
| Stearic acid | 5 |
| Carbon black (channel black) | 50 |
| Zinc oxide | 5 |
| Meta-dinitroso benzene | 1 |

A sample of this material was cured for 15 minutes at 240° F., and was found to give a tensile strength of 1650 pounds per square inch with an elongation at break of 375%.

EXAMPLE 6

A sample of chloroprene was polymerized in emulsion in substantially the same manner as Example 4, and compounded on the cold mill according to the following recipe:

| | Parts |
|---|---|
| Polychloroprene | 100 |
| Stearic acid | 5 |
| Carbon black (channel black) | 50 |
| Zinc oxide | 5 |
| Meta-dinitroso benzene | 1 |

Samples of this compound were cured for 15 and 30 minutes at 240° F. to yield inspection records as shown in Table II.

Table II

| Time of Cure, min. | Tensile Strength, lbs./sq. in. | Percent Elongation |
|---|---|---|
| 15 | 2,540 / 2,440 | 350 / 350 |
| 30 | 2,670 / 2,590 | 400 / 450 |

EXAMPLE 7

A sample of natural rubber (smoked sheet) was compounded according to the following recipe:

|  | Parts |
|---|---|
| Rubber | 100 |
| Stearic acid | 5 |
| Carbon black (channel black) | 50 |
| Zinc oxide | 5 |
| Meta-dinitroso benzene | 1 |

Samples of this compound were cured for 15 and 30 minutes at 240° F. and tested to yield the inspection results shown in Table III.

Table III

| Time of Cure, min. | Tensile Strength, lbs./sq. in. | Percent Elongation |
|---|---|---|
| 15 | 350 / 350 | 300 / 275 |
| 30 | 395 / 445 | 275 / 300 |

These results all show the rapid and effective cure of these rubbery substances by meta-dinitroso benzene and its homologues. It may be noted that there is a substantial variation in tensile strength obtainable with the several rubbers. This is in part due to differing requirements in the way of time and temperature of curing; and, where maximum tensile strength is desired, it may be obtained by adjustment of times, temperatures, and other curing aids.

The meta-dinitroso benzene used in the above examples was prepared by the method of Alway and Gortner, Ber. 38, 1899 (1905). In this procedure meta-dinitro benzene was reduced with zinc and hydrochloric acid to m-phenylene dihydroxylamine. This material was then oxidized with ferric chloride to meta-dinitroso benzene, as shown in the following series of reactions:

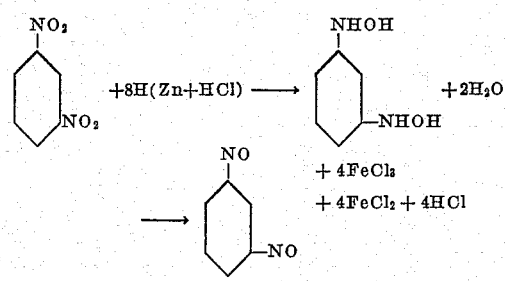

It may be noted that the yields by this procedure are low, and the material is preferably prepared by other more efficient methods.

As is above pointed out, other meta-dinitroso alkyl compounds are similarly useable, including homologues of meta-dinitroso benzene in which one or more of the nuclear hydrogens has been replaced by an alkyl or aryl group: such compounds as meta-dinitroso toluene being useful in common with meta-dinitroso xylene and the like. Other aromatic compounds such as 1,3-dinitroso naphthalene are similarly usable and also alkyl or aryl substituted meta-dinitroso naphthalenes. Likewise, the 1,3 or 2,4-dinitroso anthracene is similarly useful along with its alkyl and aryl substituent derivatives.

The above examples show the curing of a wide range of rubber-like substances and the curing agent is applicable to a wide variety of rubbers or rubber-like substances. It is desirable that there be an abundance of unsaturation present in the polymer molecules to permit of the ready combination of the dinitroso compound with the polymer molecules to establish the desired cross linkage. This is not, however, necessary; even materials deficient in unsaturation show substantial and valuable curing effects. In the above examples approximately one part of the dinitroso compound was used for the curing. This amount may, however, vary between 0.2 part per 100 of polymer and 4 or 5 parts per 100 of polymer, depending upon the speed of cure desired, depending upon the character of the cure desired, and depending upon the physical and chemical nature of the substance to be cured.

Thus the composition of matter of the present invention consists of a rubber substance in combination with a meta-dinitroso aromatic compound as curing agent.

While there are above disclosed but a limited number of embodiments of the product and process of the present invention, it is possible to provide still other embodiments without departing from the inventive concept herein disclosed and it is, therefore, desired that only such limitations be imposed upon the appended claims as are stated therein or required by the prior art.

The invention claimed is:

1. A curing process for the destruction of cold flow and establishment of definite tensile strengths in vulcanizable rubbery elastomers characterized by iodine numbers within the range between 0.5 and 340, the molecules of which have a high molecular weight hydrocarbon chain structure, comprising the steps of mixing into said elastomer from 0.5 part to 5 parts (per hundred of elastomer) of a meta-dinitroso compound having the structural formula

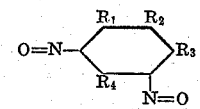

in which $R_1$, $R_2$, $R_3$, and $R_4$ are selected from the group consisting of hydrogen and aliphatic, aromatic and olefinic hydrocarbon substituents.

2. In the processing of a copolymer of a major proportion of isobutylene with a minor proportion of a multiolefin having from 4 to 14, inclusive, carbon atoms per molecule, said copolymer having an iodine number of 0.5 to 50 and an intrinsic viscosity of 0.6 to 5.0, the steps in combination of mixing into the low temperature polymer of from 0.5 part to 5 parts (per hundred of polymer) of a meta-dinitroso compound having the formula

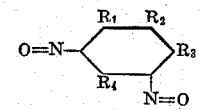

in which $R_1$, $R_2$, $R_3$ and $R_4$ are selected from the group consisting of hydrogen, an aliphatic, aromatic and olefinic hydrocarbon substituent, thereafter heating the material to a curing temperature within the range between approximately room temperature and 400° F.

3. In the processing of a copolymer of a major proportion of isobutylene with a minor proportion of a multiolefin having from 4 to 14, inclusive, carbon atoms per molecule, said copolymer having an iodine number of 0.5 to 50 and an intrinsic viscosity of 0.6 to 5.0, the steps in combination of mixing into the low temperature polymer of from 0.5 parts to 5 parts (per hundred of polymer) of meta-dinitrosobenzene.

4. A curing process for the destruction of cold flow and establishment of definite tensile strengths in vulcanizable synthetic rubber elastomers characterized by iodine numbers within the range between 0.5 and 340, selected from the group consisting of interpolymers of isobutylene with a polyolefin having from 4 to 14 carbon atoms per molecule, polybutadiene, interpolymer of butadiene with acrylonitrile, interpolymer of butadiene with styrene, and polychloroprene, comprising the steps of mixing into said elastomer from 0.5 part to 5 parts (per 100 parts of elastomer) of a dinitroso compound selected from the class consisting of meta-dinitroso compounds having the structural formula

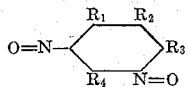

in which $R_1$, $R_2$, $R_3$ and $R_4$ are selected from the group consisting of hydrogen and aliphatic, aromatic, and olefinic hydrocarbon substituents, and compounds of that same structural type in which at least one of the oxygen atoms is esterified with an organic acid, and thereafter curing the mixture at a temperature within the range between room temperature and 400° F.

5. Process according to claim 4 in which the curing agent is meta-dinitrosobenzene.

6. Process according to claim 4 in which the curing agent is meta-dinitrosocymene.

7. Process according to claim 4 in which the curing agent is a meta-dinitrosobenzene homolog having a hydrocarbon substituent having from 1 to 12 carbon atoms.

8. Process according to claim 4 in which the curing agent is a meta-dinitrosobenzene homolog having a hydrocarbon aliphatic substituent having from 1 to 12 carbon atoms.

9. The process of curing a low unsaturation synthetic rubber consisting of an isobutylene-isoprene copolymer having an iodine number of 0.5 to 50 and having an intrinsic viscosity of 0.6 to 5.0, which comprises mixing with said copolymer 0.5 to 5 parts by weight (per 100 parts of copolymer) of meta-dinitrosobenzene, and curing the mixture at a temperature between room temperature and 400° F.

10. Process according to claim 9 in which the copolymer has an iodine number of 0.5 to 10 and an intrinsic viscosity of 1 to 2.5.

11. The process of curing a synthetic rubber consisting of a copolymer of 74% by weight of butadiene and 26% by weight of acrylonitrile, which comprises mixing with said copolymer 0.5 to 5 parts by weight (per 100 parts of copolymer) of meta-dinitrosobenzene, and curing the mixture at a temperature between room temperature and 400° F.

JOHN REHNER, Jr.
PAUL J. FLORY.

REFERENCES CITED

The following references are of record in the file of this patent:

UNITED STATES PATENTS

| Number | Name | Date |
|---|---|---|
| 1,984,417 | Mark et al. | Dec. 18, 1934 |
| 2,445,794 | Marsden | July 27, 1948 |